(12) United States Patent
Sakakibara

(10) Patent No.: US 6,699,522 B2
(45) Date of Patent: Mar. 2, 2004

(54) INORGANIC INSULATION COATING MATERIAL

(76) Inventor: Takeshi Sakakibara, 6-52-5-401 Nogata, Nakano-ku, Tokyo (JP)

( * ) Notice: Subject to any disclaimer, the term of this patent is extended or adjusted under 35 U.S.C. 154(b) by 4 days.

(21) Appl. No.: 10/179,479

(22) Filed: Jun. 24, 2002

(65) Prior Publication Data

US 2003/0235651 A1 Dec. 25, 2003

(51) Int. Cl.[7] ................................. B05D 1/00
(52) U.S. Cl. ................ 427/201; 427/204; 427/205; 427/383.8; 427/397.7; 106/286.5; 106/286.8; 106/287.17; 106/287.34; 148/284
(58) Field of Search ................ 427/201, 204, 427/254, 383.3, 397.7; 106/286.5, 286.8, 287.17, 287.34; 428/446, 450, 331, 332

(56) References Cited

U.S. PATENT DOCUMENTS

| | | | | |
|---|---|---|---|---|
| 3,816,158 A | * | 6/1974 | Jacobs | 427/205 |
| 4,204,021 A | * | 5/1980 | Becker | 428/325 |
| 4,498,936 A | * | 2/1985 | Haselkorn | 148/245 |
| 5,004,629 A | * | 4/1991 | Svec et al. | 427/204 |

* cited by examiner

Primary Examiner—Robert Dawson
Assistant Examiner—Christopher Keehan
(74) Attorney, Agent, or Firm—Mark R. Hennings; Merchant & Gould

(57) ABSTRACT

An inorganic coating material maintains the properties of high heat resistance and high electrical insulating characteristics of inorganic materials, while enhancing the degree of adhesion with respect to an object to be coated. A water-based suspension with a specific gravity in the range of 1.5 to 2.5 is obtained by using as major raw materials at least two types of metal oxide particles having heat-resistant characteristics at temperatures above 1000° C., distributing diameters of these particles in the range of 0.1 $\mu$m to 30 $\mu$m, adjusting the average value of their particle diameters to 0.2 $\mu$m to 0.8 $\mu$m, and adding water and stirring

6 Claims, 3 Drawing Sheets

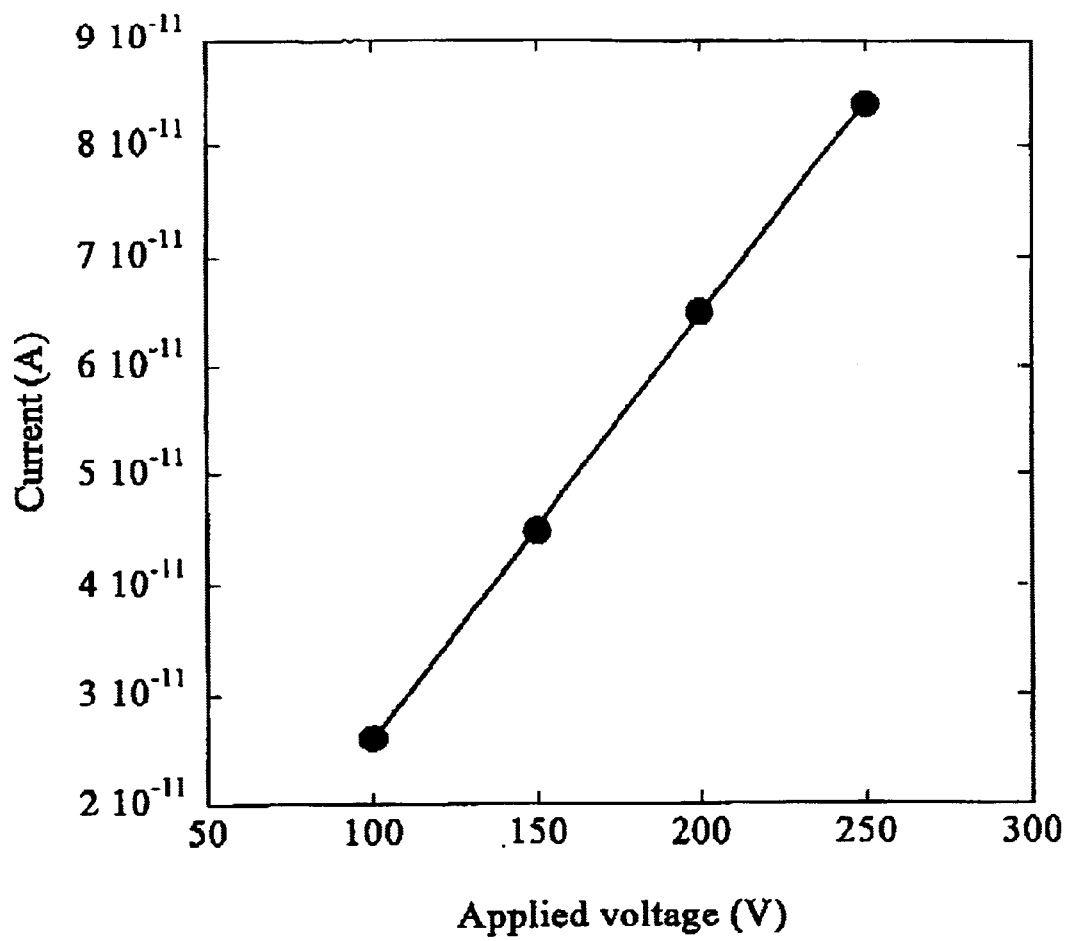
Fig. 2(a) V-I Characteristic of the coating layer (before heating)

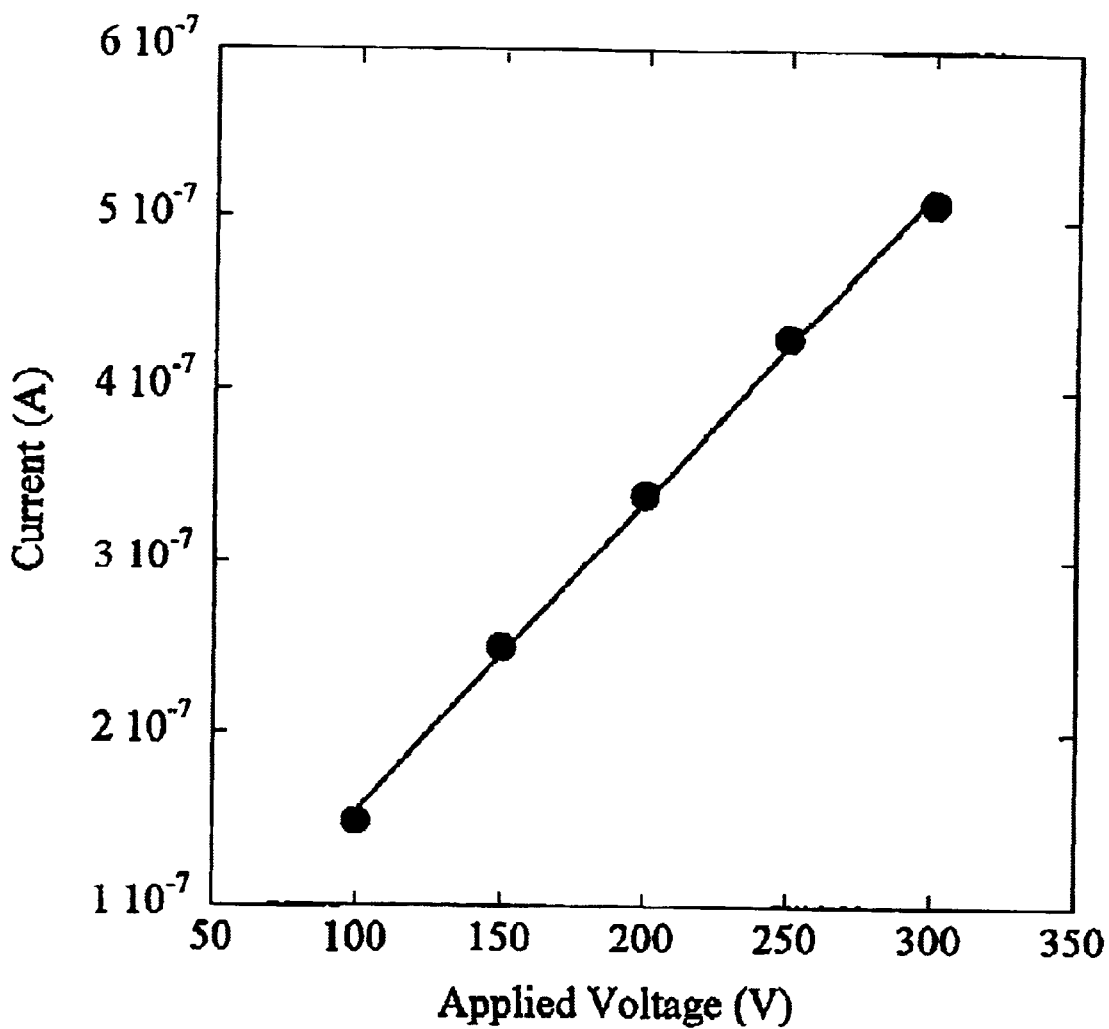
Fig. 2(b)  V-I Characteristic of the coating layer
(after heating at 700 degrees centigrade for 2 hours)

INORGANIC INSULATION COATING MATERIAL

FIELD OF THE INVENTION

The present invention relates generally to, inorganic coating materials, and more particularly to using an inorganic coating material for forming coated film electrical insulation.

BACKGROUND OF THE INVENTION

Conventionally, most coating materials are made from organic polymers and organic solvents, which may undesirably result in contamination of the atmosphere, water, soil, and the like. Disposal and handling of organic compounds has long been a problem from the viewpoint of environmental protection.

The trend in recent developments of technology related to commonly used coating materials of inorganic substances is to use mainly silicon oxide with natural quartzite as a starting material.

For example, a mixture of an alkali silicate and a carbonate is fused at a high temperature and then passed through a hydrothermal reaction to form a water-soluble silicate. A coated film is formed by a water-insolubilization reaction of alkali metal ions and a self-condensation reaction of silicate ions.

Furthermore, it is necessary that this coated film be baked at a high temperature (300° C.). Moreover, by a method for ion exchange of the alkali silicate like this in order to carry out the removal of alkali metals, a coating material consisting of colloidal silica can be obtained. This colloidal silica will supplement the low water resistance of a coated film of alkali silicate. However, in practice, adherence characteristics and skin film strength are insufficient. Reinforcing materials like metal fiber mica are used in combination.

In addition to the coating materials of pure inorganic substances like these, there are also coating materials of organic-inorganic hybrid systems. However, in the field of coating materials as a whole, a combination is used in practice only about 1% of the time. Although there are problems in production technology in the prior art, the most important consideration is reliability with respect to adherence on the material coated. In particular, for ceramics having $SiO_2$, $Al_2O_3$ and other oxides having heat resistance and high electrical insulating characteristics, adherence onto metals has always been considered to be questionable.

On the other band, technology in regard to inorganic compositions with high insulating characteristics has been upgraded by aiming at improvement in heat resistance and improvement in adhering capability with respect to the objects to be adhered or bonded.

Incombustible coating materials for use in electronic parts have been disclosed, for example, in Japanese Kokai Patent Application No. Sho 62 [1987]-25686. Binders by the combination of curing type inorganic compositions have been proposed as heat-resistant inorganic coating materials, heat-resistant agents, and so on in Japanese Kokai Patent Application No. Hei 1 [1989]-239049. Furthermore, an inorganic composition with electrical insulating characteristics has been disclosed in Japanese Kokai Patent Application No. Hei 3 [1991]-74483.

SUMMARY OF THE INVENTION

The present invention is directed towards providing an inorganic coating material that maintains the properties of high heat resistance and high electrical insulating characteristics of inorganic materials, while enhancing excellent adhesion with respect to an object to be coated. A water-based suspension state with a specific gravity in the range of 1.5 to 2.5 is obtained by using as major raw materials at least two types of metal oxide particles having heat-resistant characteristics at temperatures above 1000° C., distributing diameters of these particles in the range of 0.1 µm to 30 µm, adjusting the average value of their particle diameters to 0.2 µm to 0.8 µm, and adding water and stirring.

A more complete appreciation of the present invention and its improvements can be obtained by reference to the accompanying drawings, which are briefly summarized below, to the following detailed description of illustrated embodiments of the invention, and to the appended claims.

BRIEF DESCRIPTION OF THE DRAWINGS

FIG. 2 is a graph (a) before heating and (b) after heating for the comparison of electrical resistance before and after a heating treatment at 700° C. for a coated film prepared from a water-based suspension in accordance with the present invention having the particle size distribution shown in FIG. 1.

DETAILED DESCRIPTION OF THE PREFERRED EMBODIMENT

Figure 1:
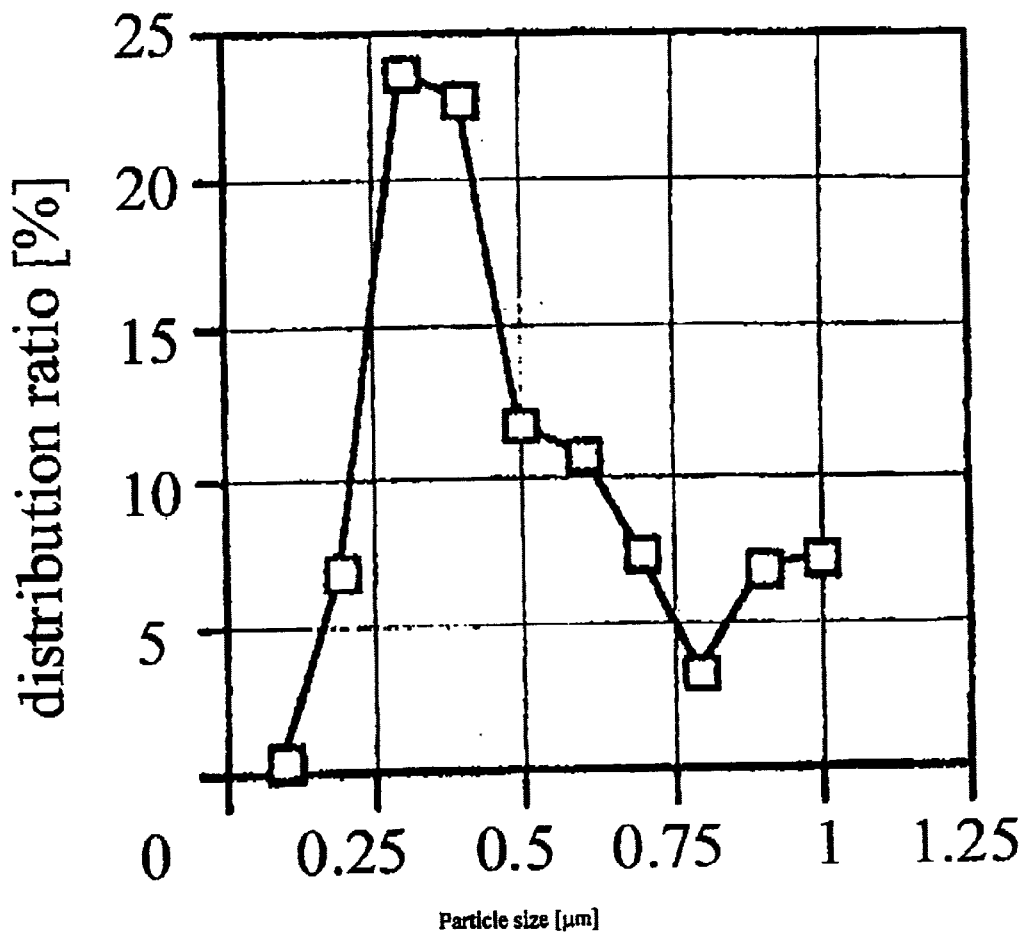
FIG. 1 is a graph showing the particle size distribution of particles in the water-based suspension of an insulating inorganic coating material in accordance with an embodiment of the present invention.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention The following detailed description is, therefore, not to be taken in a limiting sense, and the scope of the present invention is defined only by the appended claims.

The present invention is directed towards providing an inorganic coating material that maintains the properties of high heat resistance and high electrical insulating characteristics of inorganic materials, while enhancing excellent adhesion with respect to an object to be coated. A water-based suspension state with a specific gravity in the range of 1.5 to 2.5 is obtained by using as major raw materials at least two types of metal oxide particles having heat-resistant characteristics at temperatures above 1000° C., distributing diameters of these particles in the range of 0.1 µm to 30 µm, adjusting the average value of their particle diameters to 0.2 µm to 0.8 µm, and adding water and stirring.

It is desired that inorganic and other coating materials that have excellent heat resistance and fire resistance, also have reliability in adhesion with respect to materials to be coated under severe conditions. Furthermore, it is desirable that these properties be maintained even after heating with an inorganic composition.

However, conventional coating materials of pure inorganic substances (beginning with inorganic compositions described in the various patent applications described previously) do not have sufficient heat resistance even if they have good adhesion. Additionally, compositions of inorganic materials often are unreliable due to low adhesion even if they have high heat resistance.

These problems are often disadvantageous for pure inorganic coating materials especially if the objects to be coated are metals, since mechanical spalling occurs naturally because of differences in the thermal expansion coefficient from that of the coated inorganic material. Such spalling of the coating has been inevitable with a large temperature change.

On the other hand, pure inorganic materials are very good as electric insulators and have been widely used as heat-resistant insulating materials. However, using pure inorganic materials in insulation coatings has similar problems with adhesion as described previously.

The present invention provides an inorganic coating material that maintains the high heat resistance and high electric insulating characteristics of inorganic materials, while maintaining excellent adhesion with respect to the object to be coated.

In accordance with an embodiment of the present invention, an inorganic coating material in a water-based suspension contains at least two metal oxides, wherein the metal oxides are provided as microparticles having a specific gravity range of 1.5–2.5, the microparticles having particle diameters distributed in the range of 0.1 μm to 30 μm, and the microparticles having an average value of adjusted particle diameters in the range of 0.2 μm to 0.8 μm.

The inorganic coating material related to the present invention, can be further characterized by the two metal oxides being silicon dioxide and aluminum oxide, while other metal oxides are contained at 5-wt % to 30-wt % of the entire amount of added components.

Furthermore, the inorganic coating material related to the present invention, can be further characterized by the inorganic coating material being formed as an electrical insulation coated film having an electrical resistance value after the film formation in the range of $10^{10}$ Ω cm to $10^{16}$ Ω cm.

Moreover, the inorganic coating material related to the present invention, can be further characterized by being used for the formation of an electrical insulation coated film that maintains an electrical insulation resistance value of more than $10^8$ Ω cm without peeling off after experiencing a heating history in a temperature range of −90° C. to 800° C. after the formation of the film on a metal plate.

In order to prepare a pure inorganic coating material consisting of granules of metal oxides, experimental investigations have been conducted related to the shape of granules, particle diameter, and specific gravity in water-based suspension states and so on in combinations of a variety of metal oxides. As a result, it has been discovered that the state of the particle size distribution of the metal oxides is a major factor for excellent adhesion with respect to materials to be coated (especially metals) with coating materials (such as coated films).

For example, it has been demonstrated that adhesion to a metal plate is substantially increased if about 80% of the particles as a whole have diameters less than 1 μm with the distribution of the particle diameters in the range of 0.1–30 μm even when the blending ratio of silicon dioxide and aluminum oxide as the major materials is varied at ratios of 1:1, 1:2, 2:1, and the like.

Furthermore, for a coated film with a strong adhesion that does not spall from the coated material (metal) even after experiencing thermal history of a high temperature of more than 700° C., the center of the particle size distribution of the previously mentioned particles constituting said film is in the range of 0.2 μm to 0.7 μm. It has been shown that these constitute more than half of the particles as a whole.

The particle diameter distribution determines the heat resistance characteristics of the electrical insulation and the heat resistance characteristics of the electrical insulation by the addition of metal oxides other than silicon dioxide and aluminum oxide.

Furthermore, as long as the particle diameter distribution is maintained as mentioned above, spalling does not occur and the characteristics as an electric insulator are also sufficiently maintained in the case of the addition of thermal impact [resistance] from high temperatures (around 500° C. to 800° C.) to ambient temperatures and from extremely low temperatures (−190° C.) to ambient temperature.

The degree of adhesion of a heat-resistant pure inorganic coating material is dependent on the particle diameter distribution of metal oxides. With regard to the phenomenon of no spalling, even with thermal impact, it is presumed that microfine crevices between particles constituting the coated film function in the absorption of mechanical strain. A hypothesis has been reached that spalling does not occur as a result of the dispersion of stresses during thermal expansion and thermal shrinkage of the entire coated film material.

According to the present invention, a coating material having high heat resistances and electrical insulating characteristics and exhibiting strong adhesion with respect to a metal is provided by the preparation of a pure inorganic coating material of a water-based suspension by the fine adjustment of particle diameters of metal oxides of raw materials as described previously.

The inorganic coating material related to the embodiments of the present invention is obtained by using two or more types of metal oxide particles with heat-resistant temperatures above 1000° C. as major raw materials, distributing diameters of these particles in the range of 0.1 μm to 30 μm, adjusting the average value of their particle diameters to 0.2 μm to 0.8 μm, and adding water and stirring to yield a material in a water-based suspension state with a specific gravity in the range of 1.5 to 2.5. At this time, it is desirable to add an appropriate amount of inorganic binder. The amount is such that the specific gravity of the suspension is in the range mentioned previously.

It is desirable that the stirring condition be changed appropriately according to the total weight, the types, the mixing ratio, and the average particle diameter of the metal oxides with an objective of achieving uniform dispersion of metal oxide particles in the water-based suspension.

It is desirable that a type of inorganic binder be appropriately selected in the case of carrying out adjustments to improve adhesion with respect to the coated metal and the electrical resistance characteristics by blending other metal oxides at a weight ratio of less than 30% of the total as additive components in addition to silicon dioxide and aluminum oxide. An important condition of these operations is that the structure of the completed coated film maintains a uniform particle distribution state in the maimer described previously. As a result, non-spalling characteristics are obtained by allowing the appropriate presence of microfine crevices between particles.

FIG. 1 is a graph showing the particle size distribution of particles in the water-based suspension of an example insulating inorganic coating material in accordance with an embodiment of the present invention. A material obtained by mixing silicon dioxide and aluminum oxide at a ratio of 2:1 was stirred in water. As an additive component, titanium oxide was added at 20%. A suspension with a specific gravity of 1.9 was prepared. The particle diameters of the metal oxides in this suspension were distributed in the range of 0.1 $\mu$m to 10 $\mu$m. About 50% of said had a diameter in the range of 0.2 $\mu$m to 0.5 $\mu$m. Their state is shown in FIG. 1. FIG. 1 is a graph showing the particle size distribution of the metal oxides used.

The coating material in suspension form was coated on a stainless steel plate. After natural drying, it was heated at 150° C. for 2 hours to carry out film formation. This coated film had a thickness of about 100 $\mu$m. It was heated in an electric furnace at 700° C. for 2 hours. No change in quality, spalling or the like was observed. Furthermore, the same result was obtained after exposure in liquid nitrogen for 10 minutes. Spalling did not occur even with a thermal impact test by throwing the plate into water (at room temperature) from high-temperature and cryogenic states such as these.

This coated film had an insulation resistance of about $10^{15}$ $\Omega$ cm at ambient temperature. After the heating at 700° C. for 2 hours mentioned previously, it decreased to $10^{10}$ $\Omega$ cm or so. However, an ohmic state was maintained and the material functioned sufficiently as an electric insulator. The characteristics are shown in FIG. 2. FIG. 2 is a graph (a) before heating and (b) after heating for the comparison of electrical resistance before and after a heating treatment at 700° C. for an example coated film prepared from a water-based suspension having the particle size distribution shown in FIG. 1.

In contrast, when 70% of the particles having a particle diameter of about 1 $\mu$m in a suspension prepared by mixing silicon dioxide, aluminum oxide, and titanium oxide occur in ratios, spalling occurred in the heat-resistance testing mentioned previously.

Thus, an inorganic coating material related to an embodiment of the present implementation can pro vide a water-based inorganic coating material that protects the coated material over a wide temperature range from liquid nitrogen temperature to more than 800° C. It can also be used as a heat-resistant electrically insulating material having excellent adhesion with respect to metal, wood and so on, being resistant to thermal impact, as well as having high insulation resistance.

As described above in greater detail, the present invention provides an inorganic coating material having excellent adhesion and high electrical insulating characteristics. By careful investigation and adjustment of the diameters of the metal oxide particles of the raw materials followed by mixing, performance can be improved The inorganic coating material of the present invention is a material that functions not only as a coating for common heat resistance but also as a heat-resistant electrical insulating material in a wide temperature range.

Furthermore, from the viewpoint of environmental protection, the desire to develop an inorganic coating material instead of an organic coating material is very strong. The present invention is helpful in this regard.

The above specification, examples and data provide a complete description of the manufacture and use of the composition of the invention. Since many embodiments of the invention can be made without departing form the spirit and scope of the invention, the invention resides in the claims hereinafter appended.

I claim:

1. An inorganic coating material, comprising:

in a water-based suspension, at least two metal oxides, wherein the metal oxides are provided as microparticles having a specific gravity range of 1.5–2.5, the microparticles having particle diameters distributed in the range of 0.1 $\mu$m to 30 $\mu$m, and the microparticles having an adjusted average value of particle diameters in the range of 0.2 $\mu$m to 0.8 $\mu$m.

2. The suspension of claim 1, wherein the two metal oxides are silicon dioxide and aluminum oxide, and further comprising other metal oxides at 5-wt % to 30-wt % of the materials in suspension.

3. An electrically insulative film of inorganic coating material comprising:

at least two metal oxides, wherein the metal oxides are provided as microparticles having a specific gravity range of 1.5–2.5, the microparticles having particle diameters distributed in the range of 0.1 $\mu$m to 30 $\mu$m, and the microparticles having an adjusted average value of particle diameters in the range of 0.2 $\mu$m to 0.8 $\mu$m, wherein the film has an electrical resistance value in the range of $10^{10}$ $\Omega$ cm to $10^{16}$ $\Omega$ cm.

4. The film of claim 3 wherein the film maintains an electrical insulation resistance value of more than $10^8$ $\Omega$ cm without peeling off after experiencing a heating history in a temperature range of –190° C. to 800° C. after the formation of the film on a metal plate.

5. A method for producing an electrically insulative film of inorganic coating, comprising:

providing at least two metal oxides as microparticles having particle diameters distributed in the range of 0.1 $\mu$m to 30 $\mu$m;

forming a liquid suspension having a specific gravity range of 1.5 to 2.5 using the provided metal oxides;

coating the liquid suspension on a substrate; and heating the coated substrate at a temperature above 100° C. to enable film formation on the substrate.

6. The method of claim 5, further comprising heating the coated substrate in an electric furnace at 700° C. for 2 hours.

* * * * *